(12) United States Patent
Morgan et al.

(10) Patent No.: US 6,478,959 B1
(45) Date of Patent: Nov. 12, 2002

(54) SELF-FIXTURING FILTER

(75) Inventors: Jeffrey S. Morgan, Oregon, WI (US); Kent J. Kallsen, Oregon, WI (US)

(73) Assignee: Nelson Industries, Inc., Stoughton, WI (US)

( * ) Notice: Subject to any disclaimer, the term of this patent is extended or adjusted under 35 U.S.C. 154(b) by 14 days.

(21) Appl. No.: 09/712,532

(22) Filed: Nov. 14, 2000

(51) Int. Cl.$^7$ .......................... B01D 27/08; B01D 27/06
(52) U.S. Cl. .................. 210/493.1; 210/484; 210/485; 210/493.2; 210/497.01; 210/458
(58) Field of Search .................... 210/493.1–493.2, 210/493.5, 497.01, 483, 485, 484, 455, 458

(56) References Cited

U.S. PATENT DOCUMENTS

| | | | |
|---|---|---|---|
| 2,463,723 A | * | 3/1949 | Spraragen |
| 2,593,293 A | * | 4/1952 | Giauque |
| 2,608,302 A | * | 8/1952 | Mattei, Jr. |
| 3,013,667 A | * | 12/1961 | Jackson et al. |
| 3,314,546 A | * | 4/1967 | Briggs et al. |
| 3,385,038 A | * | 5/1968 | Davis |
| 3,486,626 A | * | 12/1969 | Close |
| 3,849,309 A | * | 11/1974 | Morris |
| 4,514,875 A | | 5/1985 | Comer |
| 4,878,930 A | | 11/1989 | Manniso et al. |

FOREIGN PATENT DOCUMENTS

EP 458 084 11/1991

* cited by examiner

Primary Examiner—Matthew O. Savage
Assistant Examiner—Marianne Ocampo
(74) Attorney, Agent, or Firm—Andrus, Sceales, Starke & Sewall, LLP

(57) ABSTRACT

A filter (110) is provided with a fixture (70) having a first set of axially extending inner pillars (72, 74, 76, 78) defining a first cylinder (80) along inner bend lines (34) of inner pleat tips (32) of an annular pleated filter element (22), a second set of axially extending outer pillars (82, 84, 86, 88) defining a second cylinder (90) extending along outer bend lines (38) of outer pleat tips (36) of the filter element (22), inner and outer circumferential rings (92 and 94) extending around the respective first and second sets of pillars and circumferentially spacing and supporting such pillars, and a plurality of radial spokes (100, 102, 104, 106) at an axial end (98) of the fixture (70), each spoke extending radially between a respective inner and outer pillar and radially spacing and supporting respective inner and outer pillars in radially spaced concentric relation defining a reception annulus (108). The filter element (22) is axially slidable into the reception annulus (108) of the fixture (70) through an open axial end (96) of the fixture (70) and is stopped against the radial spokes (100, 102, 104, 106) closing the distally opposite axial end (98) of the fixture (70).

8 Claims, 4 Drawing Sheets

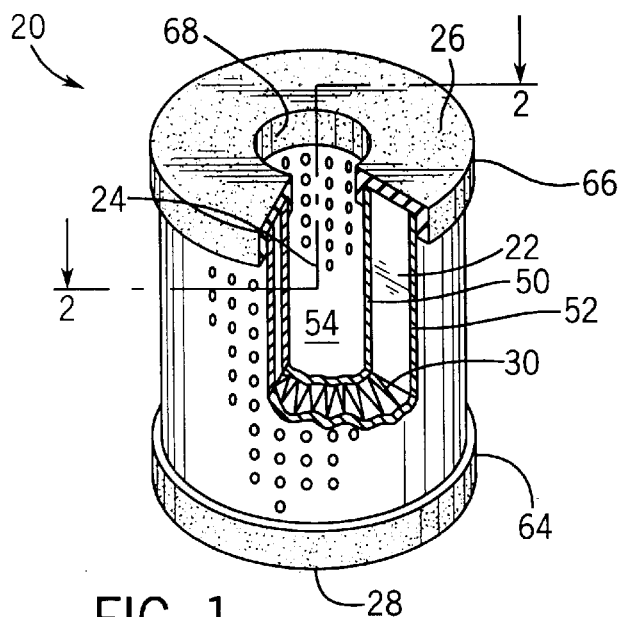
FIG. 1
PRIOR ART
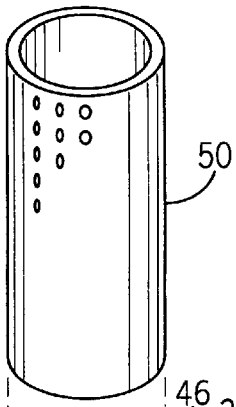
FIG. 3
PRIOR ART
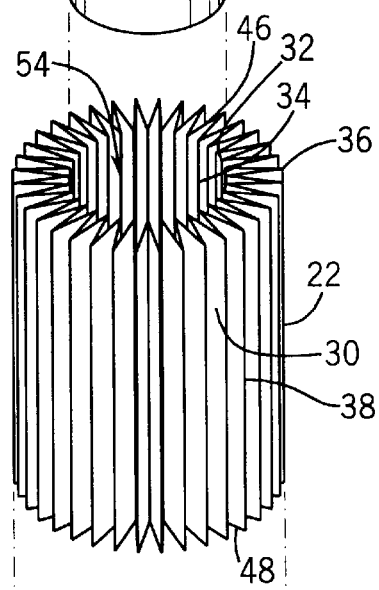
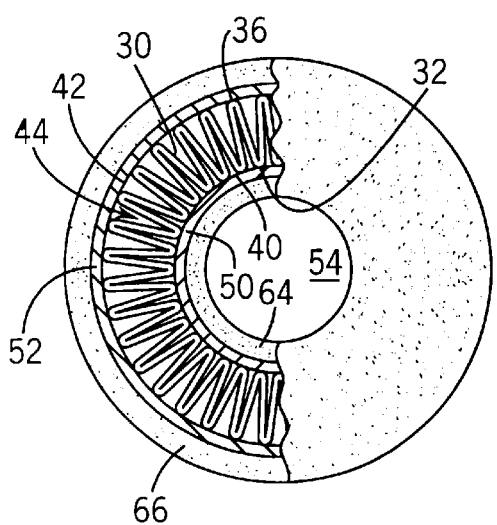
FIG. 2
PRIOR ART
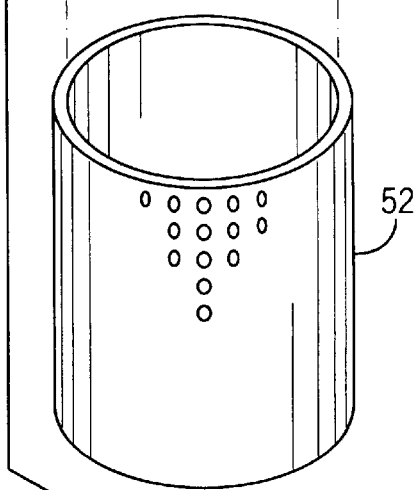

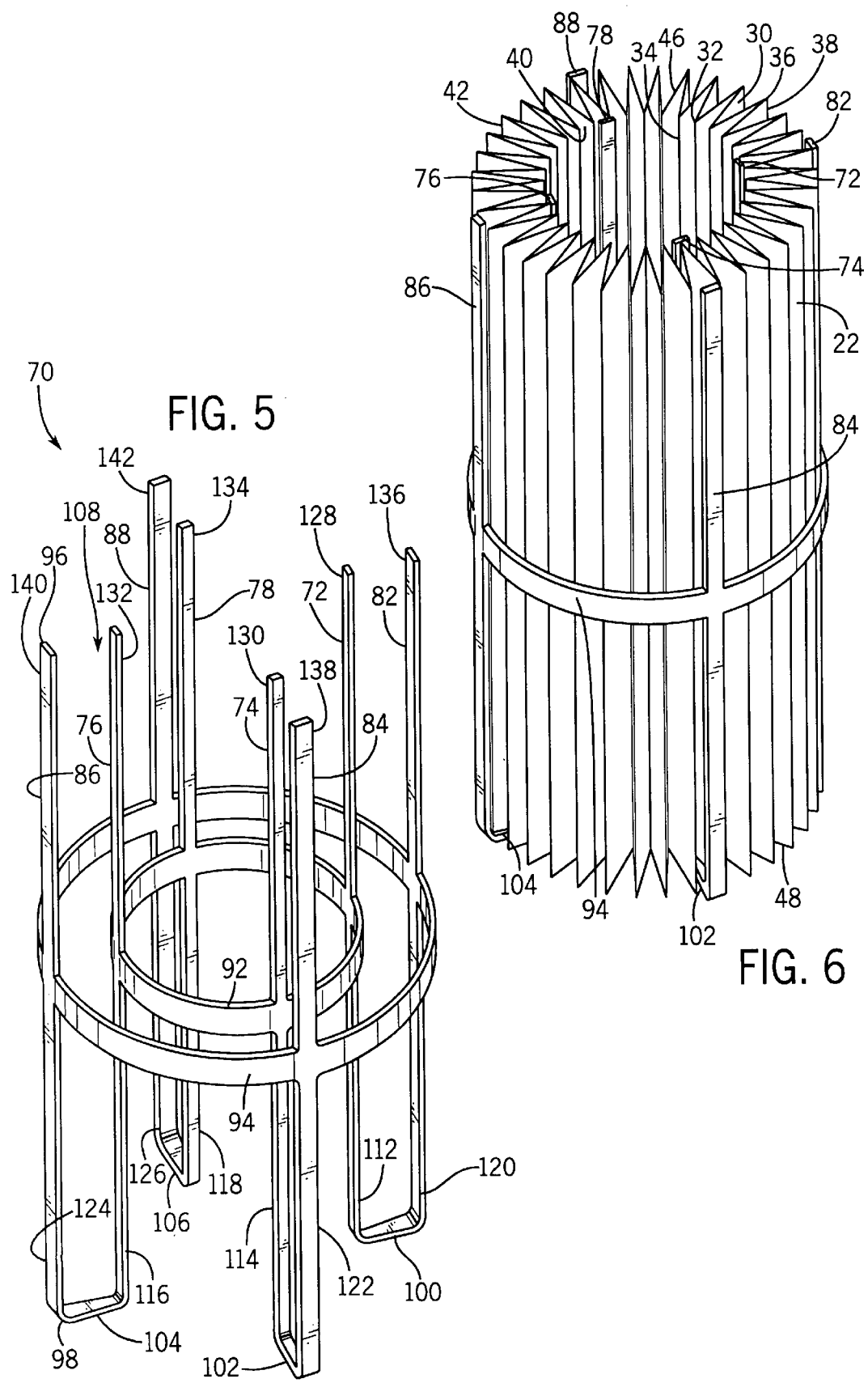

SELF-FIXTURING FILTER

BACKGROUND AND SUMMARY

The invention relates to filters having annular pleated filter elements, and more particularly to a fixture for simplified handling for manufacture.

Current manufacturing methods for making annular pleated filter elements call for the use of two separate liners, namely an inner liner and an outer liner, to hold the pleated media in an annular shape and to provide protection and collapse strength. The liners are typically perforated metal or mesh, one being an inner cylinder along the inner pleat tips, the other being an outer cylinder along the outer pleat tips. Without some additional mechanism to hold the three parts together, such as adhesive, it is difficult to handle this assembly leading to the next manufacturing operation, which is formation of the end caps.

The present invention addresses and solves the above noted problem in a particularly simple and effective manner. A fixture is provided which holds the filter element for simplified handling during manufacture. The fixture remains part of the filter after manufacture, and provides not only the noted fixturing function during manufacture, but also the noted protection and collapse strength after manufacture. The noted liners may be included or deleted as desired.

BRIEF DESCRIPTION OF THE DRAWINGS

FIG. 1 is a perspective view partially cut away of a filter element known in the prior art.

FIG. 2 is a sectional view taken along line 2—2 of FIG. 1.

FIG. 3 is an exploded perspective view of a portion of the assembly of FIG. 1.

FIG. 5 is a perspective view of a filter fixture in accordance with the invention.

FIG. 6 is a view like FIG. 5 and shows a filter element inserted in the fixture.

DETAILED DESCRIPTION

Prior Art

Figure 4:
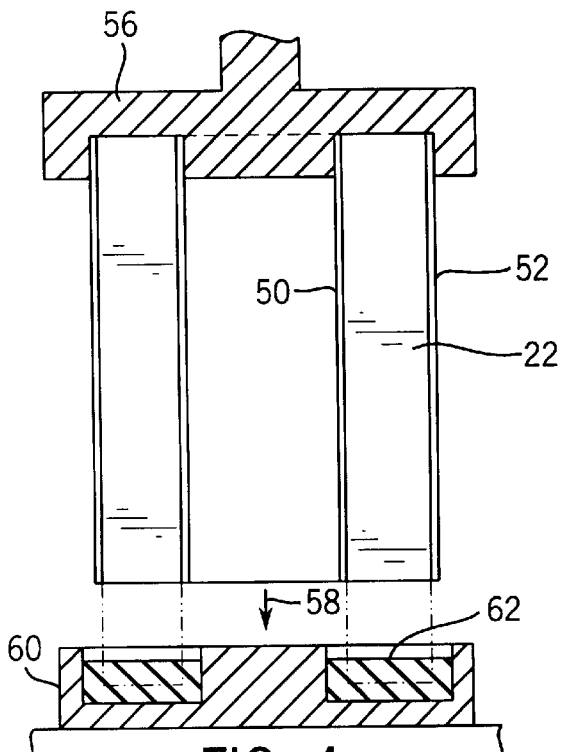
FIG. 4 is a schematic view illustrating a manufacturing operation for the assembly of FIG. 1.

FIG. 1 shows a filter 20 known in the prior art, including an annular pleated filter element 22 extending axially along an axis 24 between distally opposite axial ends 26 and 28. Filter element 22 has a plurality of pleats 30, FIGS. 1–3, extending radially between inner pleat tips 32 at inner bend lines 34, and outer pleat tips 36 at outer bend lines 38. Inner bend lines 34 extend axially and define an inner cylinder 40. Outer bend lines 38 extend axially and define an outer cylinder 42. Outer cylinder 42 is concentric to inner cylinder 40 and defines an annulus 44 therebetween. Pleats 30 of pleated filter media element 22 have axial ends 46 and 48 at the noted first and second axial ends 26 and 28 of the filter element. An inner liner 50, typically perforated metal or mesh, extends along inner cylinder 40 at inner pleat tips 32 along bend lines 34. An outer liner 52, typically perforated metal or mesh, extends along outer cylinder 42 at outer pleat tips 36 along outer bend lines 38.

During manufacture, inner liner 50 is inserted into hollow interior 54 of pleated filter element 22, and outer liner 52 is inserted around the exterior of filter element 22. This three piece subassembly must then be held together by some holding mechanism, typically adhesive, for the next manufacturing step, which is capping of the ends. The three pieces are held at their upper axial ends by a mandrel 56, FIG. 4, and then dipped axially downwardly as shown at arrow 58 into a trough 60 holding molten elastomeric material such as urethane 62, which pots the lower axial end of the filter subassembly to form end cap 64, FIG. 1. The subassembly is then turned upside down, and the process repeated, to form end cap 66. End caps 64 and 66 cover respective axial ends of the pleats and portions of the inner and outer liners. The end caps provide sealing gaskets within the filter housing (not shown), as known in the prior art. End cap 66 has a central opening 68 therethrough communicating with hollow interior 54 of the filter element. End cap 64 may have a central opening therethrough, or may extend across hollow interior 54 to close same. If end cap 64 has a central opening therethrough, then the housing typically has a cylindrical shoulder or the like extending into and sealing such opening. In a forward flow filter, the fluid to be filtered flows radially inwardly through filter element 22 into hollow interior 54 and then flows axially along axis 24 to exit at opening 68. In a reverse flow filter, the fluid to be filtered flows axially into opening 68 along axis 24 into hollow interior 54 and then flows radially outwardly through filter element 22.

Present Invention

FIGS. 5–14 illustrate the present invention and use like reference numerals from above where appropriate to facilitate understanding.

FIG. 5 shows fixture 70 for holding filter element 22, FIG. 6, for simplified handling during manufacture. Fixture 70 has a set of axially extending inner pillars 72, 74, 76, 78 defining a first cylinder 80, FIG. 10, extending along inner cylinder 40 along inner bend lines 34 at inner pleat tips 32. Fixture 70 has a set of axially extending outer pillars 82, 84, 86, 88 defining a second cylinder 90, FIG. 10, extending along outer cylinder 42 along outer bend lines 38 at outer pleat tips 36. An inner circumferential ring 92 extends around first cylinder 80 defined by inner pillars 72, 74, 76, 78, and circumferentially spaces and supports such pillars. An outer circumferential ring 94 extends around second cylinder 90 defined by outer pillars 82, 84, 86, 88, and circumferentially spaces and supports such pillars. Fixture 70 has distally opposite axial ends 96 and 98 at the ends of the pillars. A plurality of radial spokes 100, 102, 104, 106 are provided at axial end 98 of the fixture. Each spoke extends radially between a respective inner and outer pillar and radially spaces and supports respective inner and outer pillars. Radial spoke 100 extends radially between inner pillar 72 and outer pillar 82. Radial spoke 102 extends radially between inner pillar 74 and outer pillar 84. Radial spoke 104 extends radially between inner pillar 76 and outer pillar 86. Radial spoke 106 extends radially between inner pillar 78 and outer pillar 88.

Axial end 98 of the fixture is closed by radial spokes 100, 102, 104, 106. Axial end 96 of the fixture is open. Fixture 70 is preferably a single-piece plastic member having an inner support portion formed by inner pillars 72, 74, 76, 78 extending axially along inner cylinder 40 and supporting filter element 22 at inner pleat tips 32, and having an outer support portion provided by outer pillars 82, 84, 86, 88 extending axially along outer cylinder 42 and supporting filter element 22 at outer pleat tips 36, and having a radial support portion provided by radial spokes 100, 102, 104, 106 extending between the noted inner and outer support portions and maintaining the inner and outer support portions in radially spaced concentric relation defining a reception annulus 108 therebetween receiving filter element 22 therein. Filter element 22 is axially slidable downwardly in the orientation of FIGS. 5 and 6 into fixture 70 at reception annulus 108 through open first end 96 and is stopped against radial spokes 100, 102, 104, 106 at closed second end 98 of the fixture, FIG. 6. Inner ring 92 is axially spaced from axial end 98 of fixture 70 by a given axial distance, and outer ring 94 is axially spaced from axial end 98 by the same axial distance, such that outer ring 94 is radially aligned with and concentric to inner ring 92. Other spacings and non-aligned spacings are also feasible. Inner and outer liners 50 and 52 may be deleted, FIGS. 6–11, or may be included, FIGS. 12–14, to be described.

Figure 7:
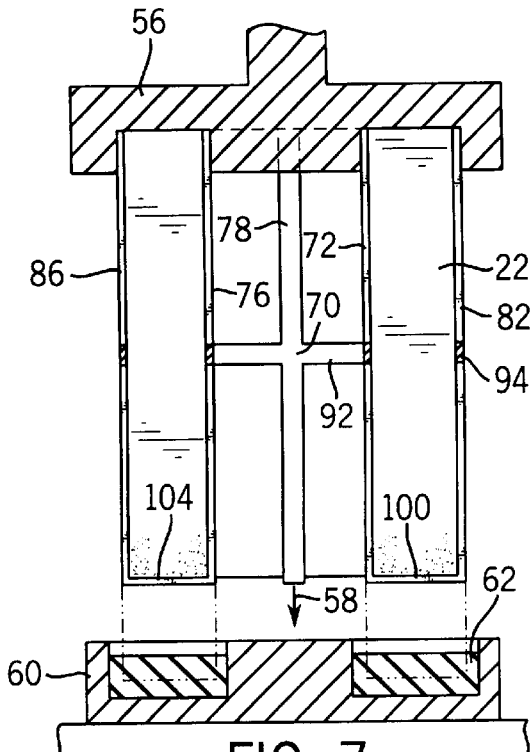
FIG. 7 is a schematic view illustrating a manufacturing operation in accordance with the invention.
Figure 9:
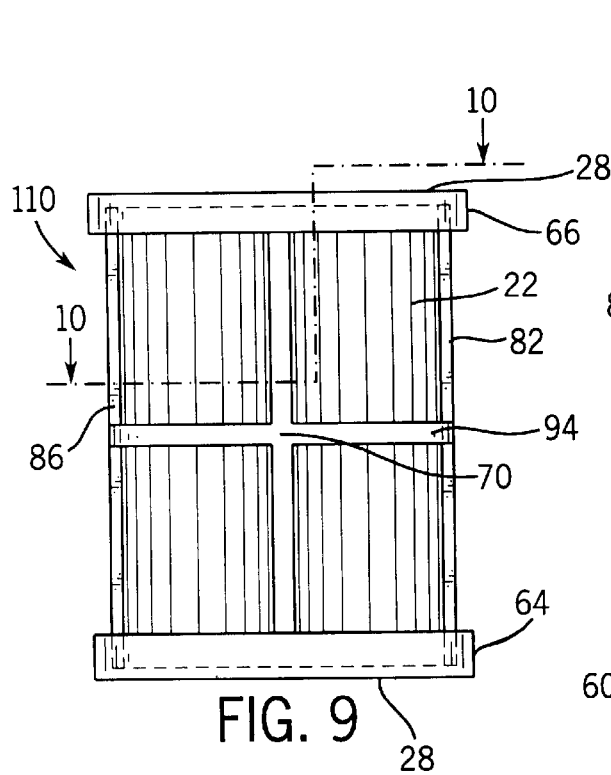
FIG. 9 is a side elevation view of a filter in accordance with the invention.
Figure 8:
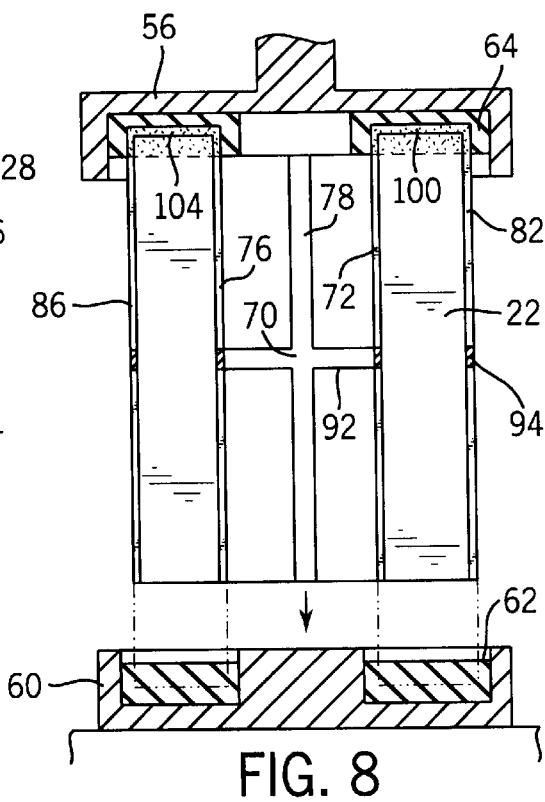
FIG. 8 is like FIG. 7 and shows a further manufacturing step.
Figure 10:
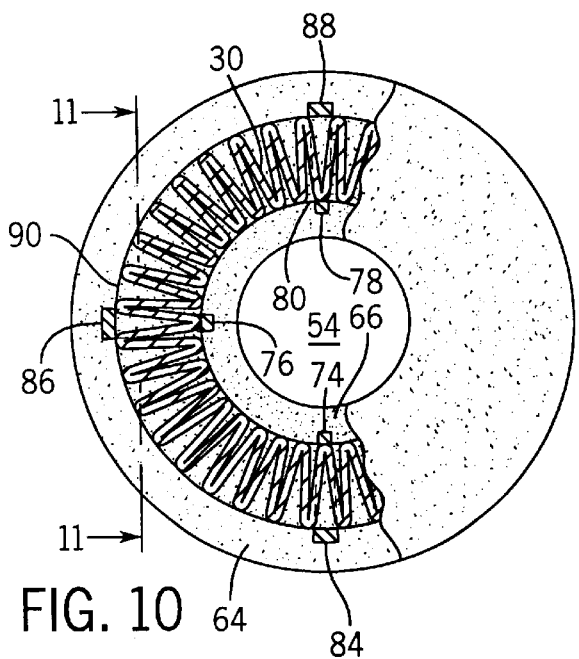
FIG. 10 is a sectional view taken along line 10—10 of FIG. 9.
Figure 11:
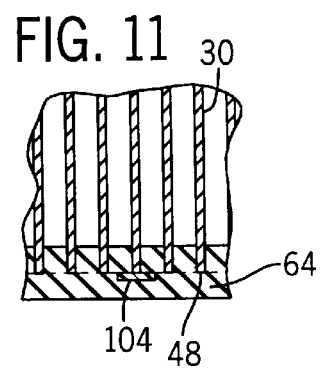
FIG. 11 is a sectional view taken along line 11—11 of FIG. 10.

The subassembly in FIG. 6 provides simplified handling during manufacture, including capping of the axial ends 46 and 48 of the filter element, without the noted inner and outer liners, if desired, and without the noted previously required holding mechanism for same such as adhesive. Fixture 70 holds filter element 22 in an annular state during manufacture, including potting of the end caps, and remains in place as part of the filter after manufacture, providing protection and collapse strength. The subassembly of FIG. 6 is axially dipped downwardly as shown in FIG. 7 at arrow 58 into the both of molten elastomeric material 62, and the subassembly is then turned upside down and dipped again as shown in FIG. 8, to yield the filter 110 of FIG. 9. End caps 66 and 64 cover axial ends 46 and 48 of the pleats at axial ends 26 and 28 of filter element 22. Radial spokes 100, 102, 104, 106 are encapsulated by end cap 64. Axial end portions 112, 114, 116, 118 of inner pillars 72, 74, 76, 78, respectively, and axial end portions 120, 122, 124, 126 of outer pillars 82, 84, 86, 88, respectively, extend into and are encapsulated by end cap 64. Axial end portions 128, 130, 132, 134 of inner pillars 72, 74, 76, 78, respectively, and axial end portions 136, 138, 140, 142 of outer pillars 82, 84, 86, 88, respectively, extend into and are encapsulated by end cap 66.

Figure 13:
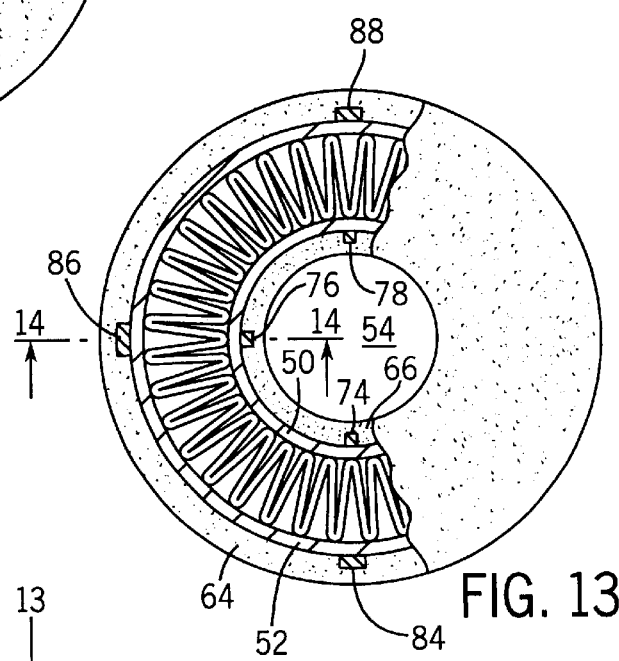
FIG. 13 is a sectional view taken along line 13—13 of FIG. 12.
Figure 12:
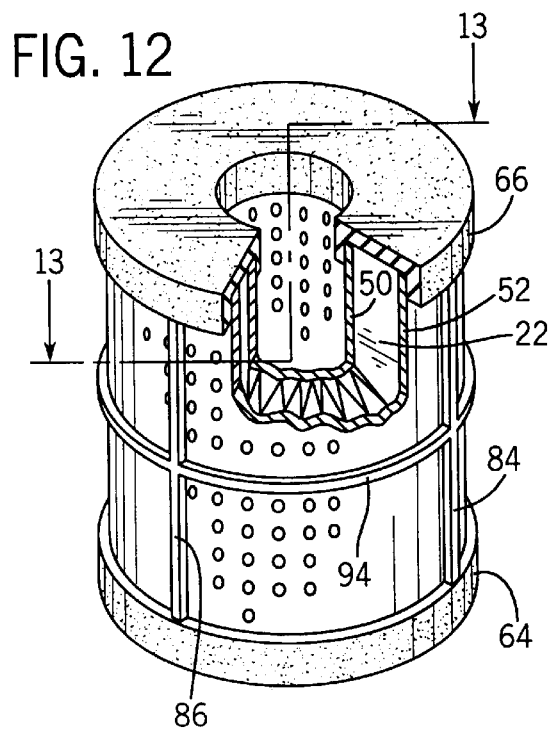
FIG. 12 is a perspective view partially cut away of an alternate embodiment of a filter in accordance with the invention.
Figure 14:
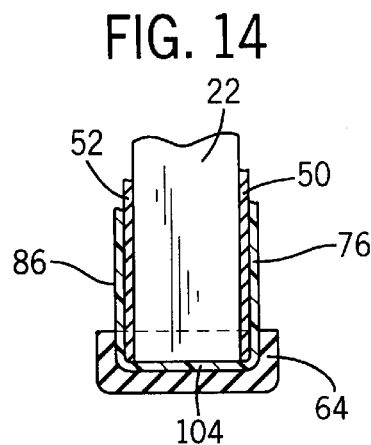
FIG. 14 is a sectional view taken along line 14—14 of FIG. 13.

FIGS. 12–14 show an alternate embodiment and use like reference numerals from above where appropriate to facilitate understanding. In FIGS. 12–14, inner and outer liners 50 and 52 are included in the subassembly of FIG. 6 such that inner liner 50 extends along inner cylinder 40 between inner pleat tips 32 and inner pillars 72, 74, 76, 78, and outer liner 52 extends along outer cylinder 42 between outer pleat tips 36 and outer pillars 82, 84, 86, 88.

The invention also provides a method for making a filter by providing a fixture 70 for holding filter element 22 in an annular state, inserting the filter element 22 into the fixture 70, and forming end caps 66 and 64 covering axial ends 46 and 48 of pleats 30 at the axial ends 26 and 28 of the filter element. The step of forming the end caps is performed with the fixture 70 in place and the filter element 22 in the fixture, and forming the end caps around the noted portions of the fixture such that such portions are encapsulated by respective ends caps.

It is recognized that various equivalents, alternatives and modifications are possible within the scope of the appended claims.

What is claimed is:

1. A filter comprising an annular pleated filter element extending axially along an axis between distally opposite first and second axial ends, said filter element having a plurality of pleats extending radially between inner pleat tips at inner bend lines, and outer pleat tips at outer bend lines, said inner bend lines extending axially and defining an inner cylinder, said outer bend lines extending axially and defining an outer cylinder, said outer cylinder being concentric to said inner cylinder and defining an annulus therebetween, said pleats having axial ends at said first and second axial ends of said filter element, a fixture holding said filter element for simplified handling during manufacturing, first and second end caps comprising first and second end caps covering said axial ends of said pleats at said first and second axial ends, respectively, of said filter element, wherein said manufacturing includes formation of said end caps, said fixture holding said filter element during said formation of said end caps, and wherein at least one of said end caps encapsulates a portion of said fixture, wherein said fixture is a single-piece member having an inner support portion extending axially along said inner cylinder and supporting said filter element at said inner pleat tips, an outer support portion extending axially along said outer cylinder and supporting said filter element at said outer pleat tips, and a radial support portion extending between said inner and outer support portions and maintaining said inner and outer support portions in radially spaced concentric relation defining a reception annulus therebetween receiving said filter element therein.

2. The invention according to claim 1 wherein said single-piece fixture member is plastic.

3. A filter comprising an annular pleated filter element extending axially along an axis between distally opposite first and second axial ends, said filter element having a plurality of pleats extending radially between inner pleat tips at inner bend lines, and outer pleat tips at outer bend lines, said inner bend lines extending axially and defining an inner cylinder, said outer bend lines extending axially and defining an outer cylinder, said outer cylinder being concentric to said inner cylinder and defining an annulus therebetween, said pleats having axial ends at said first and second axial ends of said filter element, a fixture comprising a first set of axially extending inner pillars defining a first cylinder along said inner cylinder, a second set of axially extending outer pillars defining a second cylinder along said outer cylinder, said fixture having first and second distally opposite axial ends at the ends of said pillars, at least one circumferential ring extending around at least one of said first and second cylinders defined by said pillars and circumferentially spacing and supporting respective said pillars, a plurality of radial spokes at said second axial end of said fixture, each spoke extending radially between a respective inner pillar and outer pillar and radially spacing and supporting said respective inner and outer pillars, said second axial end of said fixture being closed by said radial spokes, said first axial end of said fixture being open, said filter element being axially slidable into said fixture through said first end of said fixture and being stopped against said radial spokes at said second end of said fixture, said fixture holding said filter element for simplified handling during manufacture, two said circumferential rings, namely an inner ring extending around said first cylinder and circumferentially spacing and supporting said set of inner pillars, and an outer ring extending around said second cylinder and circumferentially spacing and supporting said set of outer pillars.

4. The invention according to claim 3 comprising first and second end caps covering said axial ends of said pleats at said first and second axial ends, respectively, of said filter element, wherein said radial spokes are encapsulated by said second end cap.

5. The invention according to claim 4 wherein portions of said inner and outer pillars at said second axial end of said fixture extend into and are encapsulated by said second end cap.

6. The invention according to claim 5 wherein portions of said inner and outer pillars at said first axial end of said fixture extend into and are encapsulated by said first end cap.

7. The invention according to claim 3 wherein said inner ring is axially spaced from said second end of said fixture by a given axial distance, said outer ring is axially spaced from said second end of said fixture by the same said given axial distance, said outer ring being radially aligned with and concentric to said inner ring.

8. A filter comprising an annular pleated filter element extending axially along an axis between distally opposite first and second axial ends, said filter element having a plurality of pleats extending radially between inner pleat tips at inner bend lines, and outer pleat tips at outer bend lines, said inner bend lines extending axially and defining an inner cylinder, said outer bend lines extending axially and defining an outer cylinder, said outer cylinder being concentric to said inner cylinder and defining an annulus therebetween, said pleats having axial ends at said first and second axial ends of said filter element, a fixture comprising a first set of axially extending inner pillars defining a first cylinder along said inner cylinder, a second set of axially extending outer pillars defining a second cylinder along said outer cylinder, said fixture having first and second distally opposite axial ends at the ends of said pillars, at least one circumferential ring extending around at least one of said first and second cylinders defined by said pillars and circumferentially spacing and supporting respective said pillars, a plurality of radial spokes at said second axial end of said fixture, each spoke extending radially between a respective inner pillar and outer pillar and radially spacing and supporting said respective inner and outer pillars, said second axial end of said fixture being closed by said radial spokes, said first axial end of said fixture being open, said filter element being axially slidable into said fixture through said first end of said fixture and being stopped against said radial spokes at said second end of said fixture, said fixture holding said filter element for simplified handling during manufacture, an inner liner extending along said inner cylinder between said inner pleat tips and said inner pillars, and an outer liner extending along said outer cylinder between said outer pleat tips and said outer pillars.

\* \* \* \* \*